US005574999A

United States Patent [19]

Gropper

[11] Patent Number: 5,574,999

[45] Date of Patent: Nov. 12, 1996

[54] ALERT RECEIVER

[76] Inventor: Daniel R. Gropper, P.O. Box 625, Vienna, Va. 22183

[21] Appl. No.: 337,198

[22] Filed: Nov. 7, 1994

Related U.S. Application Data

[63] Continuation-in-part of Ser. No. 207,537, Mar. 7, 1994, Pat. No. 5,444,433.

[51] Int. Cl.$^6$ .......... H04B 17/02

[52] U.S. Cl. .......... 455/186.1; 455/161.1; 455/161.3; 455/166.1; 455/166.2

[58] Field of Search .......... 455/161.1, 166.1, 455/166.2, 186.1, 161.2, 161.3, 34.1, 34.2, 62, 185.1, 226.2, 181.1, 184.1

[56] References Cited

U.S. PATENT DOCUMENTS

| | | | |
|---|---|---|---|
| 4,031,467 | 6/1977 | Singleton . | |
| 4,114,104 | 9/1978 | Denzene | 455/166.1 |
| 4,123,717 | 10/1978 | Yiu | 455/166.2 |
| 4,287,599 | 9/1981 | Goncharoff et al. | 455/166.1 |
| 4,608,712 | 8/1986 | Fedde | 455/166.2 |
| 4,898,431 | 2/1990 | Karnopp et al. | 303/100 |
| 4,903,320 | 2/1990 | Hanawa | 455/33.1 |
| 4,905,301 | 2/1990 | Krolopp et al. | 455/34.1 |
| 5,161,253 | 11/1992 | Hirano | 455/161.3 |
| 5,211,453 | 7/1993 | Van Zanten et al. | 303/111 |
| 5,328,255 | 4/1994 | Isella | 303/103 |
| 5,408,692 | 4/1995 | Suzuki et al. | 455/166.1 |

FOREIGN PATENT DOCUMENTS

| | | |
|---|---|---|
| 0392164 | 9/1990 | European Pat. Off. . |
| 0444772 | 2/1991 | European Pat. Off. . |
| 2242949 | 7/1991 | United Kingdom . |
| 9313969 | 3/1993 | WIPO . |

OTHER PUBLICATIONS

Bearcat 120XLT Scanner with one touch weather.

*Primary Examiner*—Reinhard J. Eisenzopf
*Assistant Examiner*—Gertrude Arthur
*Attorney, Agent, or Firm*—Daniel R. Gropper

[57] ABSTRACT

This invention relates to an apparatus and method for receiving and automatically detecting the issuance of emergency, weather or other alert messages broadcast on a radio channel, and recording that alert message into an alert receiver on solid state voice circuitry with a day and time stamp for later playback. This invention also teaches interface methods between the alert receiver and other communication systems whereby an alert message, or an alarm tone, is automatically relayed and repeated on the other communication system after the issuance of an alert message. A method and apparatus for automatically selecting the strongest received signal from a set of pre-selected channels, monitoring the selected channel for signal strength and the presence of modulated audio, and a sequence for automatically initiating the channel selection process, should certain preset minimum parameters for the received signal fail to be met, is also taught. A method and apparatus for selectively activating other communication systems for only those alert messages of specific concern to certain users of the other communication system is also taught herein. A method and apparatus in which the alert receiver user can select the radio channel and the alert tone(s) to activate the alert receiver is also taught herein.

10 Claims, 2 Drawing Sheets

ALERT RECEIVER

BRIEF SUMMARY OF THE INVENTION

This is a continuation-in-part to application Ser. No. 08/207,537, filed Mar. 7, 1994, which is now U.S. Pat. No. 5,444,433, which issued on Aug. 22, 1995.

This invention teaches a method and apparatus for receiving and detecting emergency, weather, or other alert messages broadcast on a radio channel and recording those alert messages into solid state voice storage circuitry into the alert receiver. The alert receiver also acts as an interface to automatically playback previously recorded alert messages, or to generate alarm tones, on other communication systems.

Alert messages, following an alert tone, are broadcast on a radio channel. The alert receiver automatically day and time stamps each alert message to indicate, during playback of the alert message, the day and time the alert message was received and recorded by the alert receiver.

The invention also teaches a method and apparatus for automatically scanning a set of pre-selected radio channels, determining which of the pre-selected channels has the highest received signal strength and then selecting that channel. A algorithm for re-selecting the best radio channel, based on changes of status of received signal strength and/or audio modulation, are also taught herein.

The invention also teaches a method for selectively activating other communication systems only in response to alert messages of specific interest to listeners on the other communication system.

This invention also teaches a method and apparatus for permitting the user to select a specific radio channel and to select specific alert tone(s) to activate the alert receiver.

BACKGROUND AND FIELD OF THE INVENTION

Tone activated alert receivers are well known and are regularly used by emergency agencies including fire, police, ambulance and rescue services. The National Weather Service transmits an alert tone to activate commonly available weather alert receivers to warn of impending severe and potentially life threatening weather such as tornados, thunderstorms, floods and blizzards. Known receivers can be set to issue a siren, flash an LED and/or announce the voice weather alert message in response to receiving and decoding an alert tone.

All of these alert receivers suffer from the major operational defect of the listener missing the alert message if the listener is away from the receiver when the alert is issued. If the flashing LED is seen, or the siren is heard, by the listener some time after the alert message is broadcast, the listener will have to take critical time and effort to determine the time and contents of the alert message.

The instant invention solves these problems by automatically recording the alert message, and the day and time the alert message was received, into solid state voice storage circuitry into the alert receiver. The listener is able to immediately playback the alert message upon returning to the alert receiver and will hear the day and time the alert message was received.

Most alert receivers are tuned for a specific radio channel and require special receivers. Therefore, another defect in present alerting systems is that they require listeners to individually obtain special equipment to receive the alerts of different agencies. Many listeners will not go to the time and expense of obtaining the necessary receivers and many listeners will not find it feasible to carry this equipment with them as they travel. The instant invention solves these problems by receiving and recording the alert message received on one radio channel and relaying the alert message, or an alert receiver generated alarm tone, on other communication systems, while not interfering with communication in progress on the other communication system.

A number of alert receivers, and specifically alert receivers for receiving weather alerts, have a manual switch which permits the listener to choose one radio channel to monitor from a number of preselected radio channels. For example, the National Weather Service broadcasts weather information and warning on seven different radio channels from transmitters located around the country. These alert receivers are unacceptable for mobile use as the user must manually listen to each possible radio channel and choose which radio channel to monitor. This selection cannot be safely accomplished by the driver-of the vehicle while the vehicle is in motion. Furthermore, as the vehicle moves from one location to another, and in and out of the radio signal coverage areas of the various transmitters, these alert receivers need to be manually retuned. Since the weather is continuously broadcast and is extremely tedious to listen to for more than a few minutes, most users keep the speaker muted the majority of the time. If the speaker is muted, the listener will not know that the alert receiver is out of range of a transmitter and a critical alert can easily be missed.

A number of recently manufactured scanners have a weather scan function. Pressing the weather scan button scans the seven preprogrammed weather channels and the scanner stops on the first channel on which a radio signal is received. There are a number of problems with this scan function. As stated above, the listener must press the button to start the scan sequence. If the listener is mobile, the listener will have to remember to periodically press the scan button as the vehicle moves in and out of the transmission coverage area of the various transmitters. These scanners do not have an alert feature, an alert message record feature or a day and time stamp feature, all of which are important aspects of the instant invention.

In areas with overlapping radio coverage from a number of different radio transmitters on different channels, the instant invention's scan function will automatically choose the strongest received radio signal having modulated audio. In this manner, if the normally strongest transmitter fails or if the strongest transmitter loses its modulated audio, for a preset period of time such as for thirty seconds, the instant invention's scan function will automatically seek the best backup channel, if one is available. The instant invention's scan function will also periodically monitor all of the preselected channels, at preset time intervals, such as every twenty minutes, to determine if the strongest channel has returned to service.

A common problem with alert receivers is that a number of alerts broadcast on one radio channel might not be of interest to listeners to the alert receiver or on other communication systems linked to the alert receiver. To solve this problem, the instant invention allows the user of the alert receiver to program a digital code into the alert receiver so that the alert receiver only triggers in response to specific digital codes broadcast on the monitored radio channel.

Another common problem with alert receivers is that they are usually limited to monitor one preselected radio channel and to detect a few preset alert tones on the preselected radio channel. The instant invention solves this problem by utilizing frequency synthesized technology for both selecting the radio channel to be monitored as well as the alert tone(s) to be detected.

OBJECTS OF THE PRESENT INVENTION

An object of the present invention is to create a simple and reliable emergency, weather or alert message radio receiver into which weather, emergency, or alert messages are automatically recorded for future playback.

Another object of the present invention is to automatically record the day and time stamp that each alert message is recorded so that the listener will know when the alert message was received by alert receiver.

Another object of the present invention is to automatically link the alert receiver to other communication systems, such as public address systems, land mobile repeater systems, and maritime radio communication systems, in order to permit live or previously recorded alert messages received by the alert receiver to automatically be relayed and played onto the other communication systems.

Another object of the present invention is to demodulate and decode digitally encoded broadcast messages received by the alert receiver which indicate the specific geographic area for which an alert message is relevant and to selectively activate another communication system for only alerts of interest to the listeners of the other communication system.

Another object of the present invention is to have the alert receiver operate on low voltage and low current to permit continued operation during commercial power failures by enabling the alert receiver to operate on back-up batteries.

Another object of the present is to permit the remote control of the features of the alert receiver through presently known or future developed signaling devices.

Another object of the present is to provide an alert receiver which will automatically select the radio channel with the best received signal strength with modulated audio to permit the alert receiver to be useful in mobile operations where the user is moving within the radio coverage areas of multiple transmitters on different channels as well as to enable the alert receiver to automatically select a backup channel should the primary broadcast transmitter go out of service.

Another object of the present is to provide an alert receiver where the user may manually select the radio frequency to be monitored.

Another object of the present is to provide an alert receiver where the user may manually select the sequence and frequencies of the alert tones to be detected.

SPECIFICATION

Figure 1:
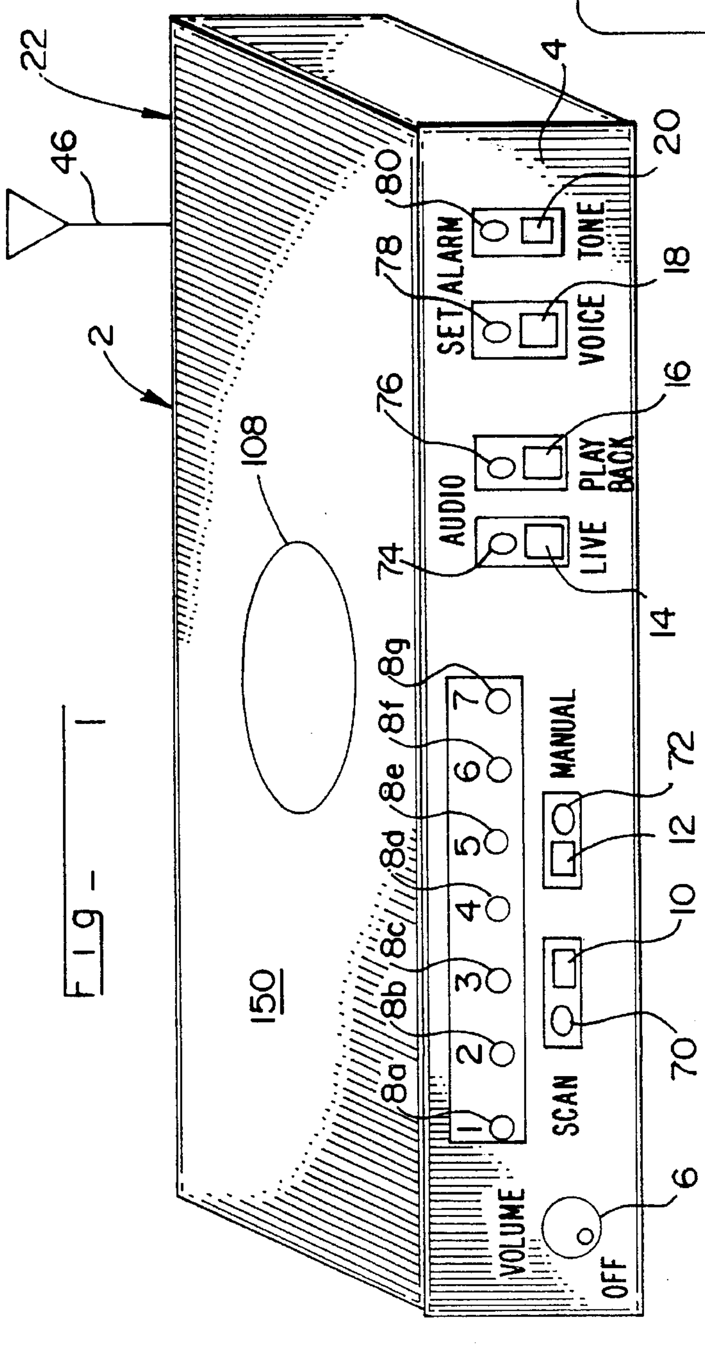
FIG. 1 is a front perspective view of alert receiver.
Figure 2:
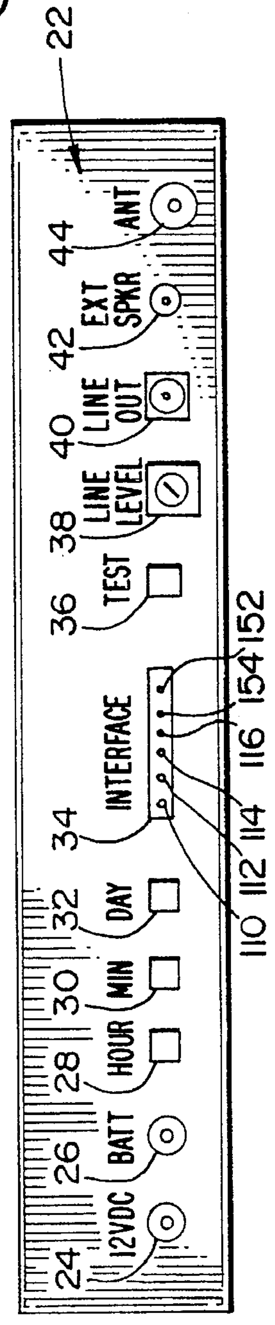
FIG. 2 is a rear elevational view of the receiver.

FIG. 1 is a front perspective view of alert receiver 2 and FIG. 2 is a rear elevational view of alert receiver 2. Alert receiver 2 has a front panel 4, a rear panel 22, and a case, generally shown as 150. The case may be of metal or plastic or of any known or future developed material suitable for enclosing a radio receiver.

The following switches and controls are on front panel 4 of alert receiver 2: On, off and volume switch 6; channel indication LEDs designated as 8*a*, 8*b*, 8*c*, 8*d*, 8*e*, 8*f*, and 8*g*; scan mode switch 10 and scan mode LED 70; manual mode switch 12 and manual LED 72; live audio switch 14 and live LED 74; playback audio switch 16 and playback LED 76; alarm voice switch 18 and alarm voice LED 78; and alarm tone switch 20 and alarm tone LED 80.

Pressing scan mode switch 10 places alert receiver 2 into the scan mode, which will be described later herein. Each press of manual mode switch 12 sequentially steps alert receiver 2 through each preselected channel as is indicated through an alarm tone 168, generated by micro controller unit 62, which is played on speaker 108. Channel indication LED 8*a* through 8*g* indicates which channel has been selected.

Pressing live audio button 14 permits live received audio from the chosen channel to be heard through speaker 108. Any audio appearing at speaker 108 also appears at external speaker jack 42 and at pin 120 of interface connector 34. Audio ground 152 is also a pin of interface connector 34. External speaker jack 42 has an internal switch which shuts off speaker 108 when external speaker jack 42 is in use.

Alarm voice switch 18 and alarm tone switch 20 set the alarm mode of alert receiver 2.

An alert tone 164 is defined as a specific tone or tone sequence broadcast to designate that alert message 166 is to follow alert tone 164. Alert tone 164 may be a single tone or a multiple tone sequence or a digital code or any signaling code hereinafter developed that may be broadcast and received, detected and decoded by alert receiver 2. When alert receiver 2 has been set in the alarm voice mode, alert message 166 is played through speaker 108, as well as through line output 40 and pins 114 and 116 on interface connector 34. The audio level of line output 40 and interface 114 and 116 is set and adjusted by line level potentiometer 38.

When alert receiver 2 is in the alarm tone mode, as set by switch 20, the reception of alert tone 164 causes alert receiver 2 to play only alarm tones 168, and not voice alert messages 166, through speaker 108, external speaker jack 42, line output 40 and external audio outputs 114, 116, and 120. If alert tone 164 is received by alert receiver 2 when alert receiver 2 is in alarm voice mode, voice alert message 166 is played through speaker 108, external jack 42, line output 40 and external audio outputs 114, 116, and 120.

In this manner the user selects whether either voice alert message 166, or only alarm tones 168, are output from alert receiver 2. This decision will usually be based on the audience which will receive alert messages 166 from alert receiver 2. In situations where discrete warnings are required, such as at a public assembly area as a stadium or a theater, alert receiver 2 will usually be set in the alarm tone mode. In situations where the threat of life threatening severe weather, or other emergencies, is likely to outweigh any inconvenience caused by alert message 166 interrupting activities in progress, alert receiver 2 is likely to be set in the alarm voice mode.

Figure 3:
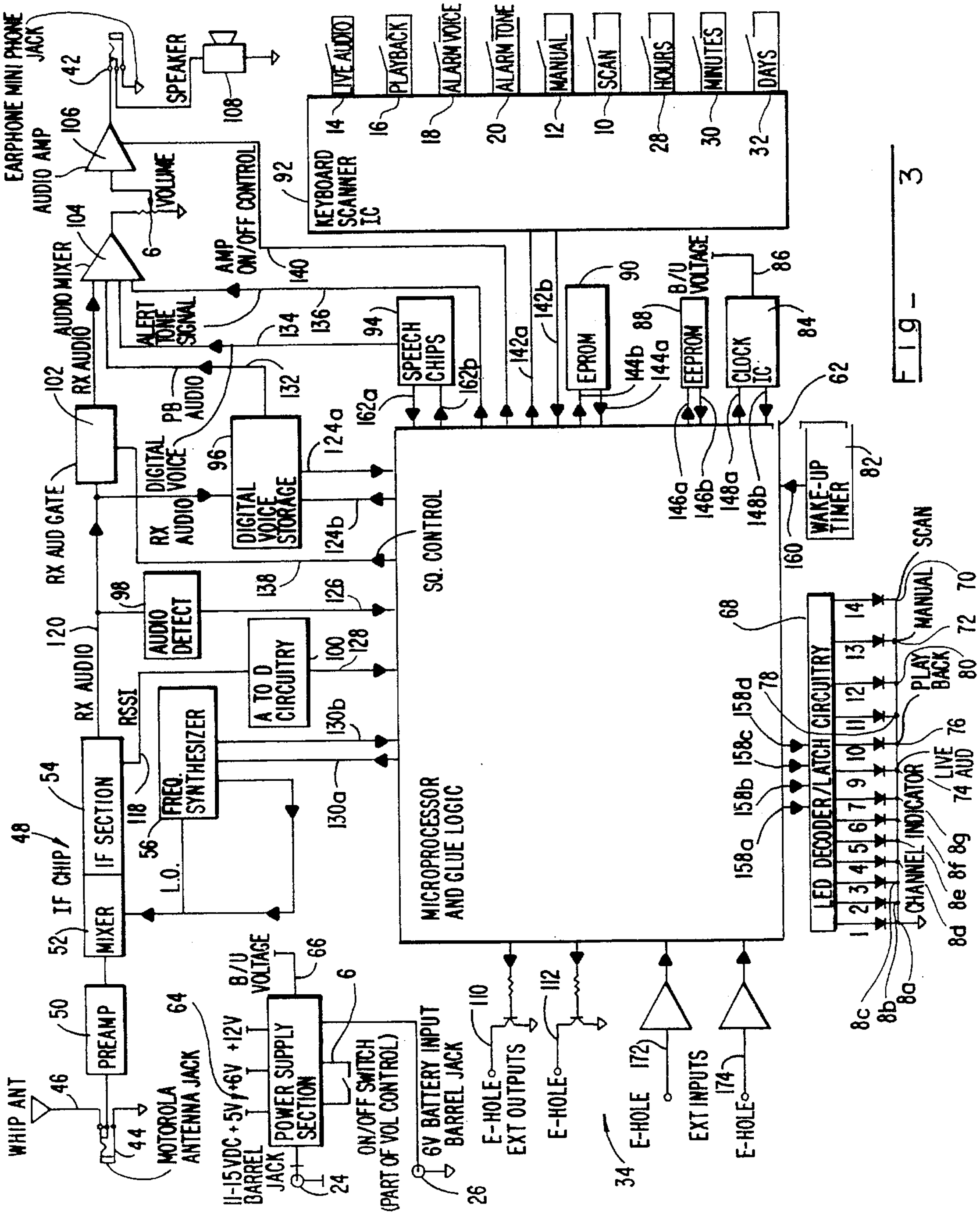
FIG. 3 is a block diagram of alert receiver.

FIG. 3 is a block diagram of alert receiver 2. Power for alert receiver 2 may be input into alert receiver 2 through a variety of means including through DC power jack 24. Power into alert receiver 2 may be supplied by a power cube or similar power supply device from commercially available power sources. Additionally, power may be supplied by connection to automobile, boat, truck or other vehicle DC systems through jack 24. Alternatively, battery power may be input into battery jack 26 to enable alert receiver 2 to have battery back-up power should commercial power fail.

Alert receiver 2 also saves the day and time for each alert message 166 received and recorded by alert receiver 2. The day and time stamp is set through adjustment of hour adjust switch 28, minute adjust switch 30, and day adjust switch 32. An internal backup battery keeps the hardware time keeping circuitry operating when no power is being applied to alert receiver 2.

Logic output for automatic control of other communication systems and for control of special alerting devices is provided at pins 110 and 112. Pins 110 and 112 trigger each time audio appears at line outputs 114, 116 and 40. Audio will usually appear at external audio outputs 114, 116 and 40 when alert receiver 2 is in the alarm voice mode and either live audio switch 14 or playback audio switch 16 is pressed, or when alert tone 164 is detected by alert receiver 2. Pins 110 and 112 will also trigger each time alert receiver 2 generates alarm tone 168.

Test switch 36 simulates the reception and decoding of alert tone 164 by alert receiver 2 and initiates the record cycle of alert receiver 2.

A female Motorola-type antenna jack 44 is on rear panel 22 of alert receiver 2. Motorola antenna jack 44 is configured to accept the base of a telescoping antenna 46 or a standard automobile antenna plug.

Each time alert tone 164 is received and detected by alert receiver 2, alert message 166, following alert tone 164, is digitally recorded onto a digital voice storage chips 96. Digital voice storage chips 96 are controlled by digital voice storage control lines 124 a and b and micro controller unit 62. Recorded alert messages 166 may be played back by pressing playback switch 16, or automatically as part of the alarm voice mode.

Radio receiver section 48 includes antenna 46, Motorola antenna jack 44, RF preamplifier stage 50, IF mixer 52, IF section 54, and frequency synthesizer 56 for the local oscillator.

For alert receivers 2 dedicated to receiving the seven weather channels, micro controller unit 62 will control frequency synthesizer 56 through frequency synthesizer control lines 130 *a* and *b*.

Figure 4:
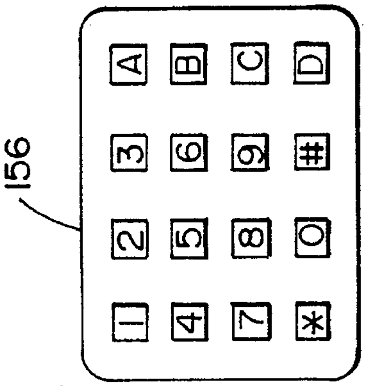
FIG. 4 is a perspective view of a DTMF keypad to control the alert receiver.

In an alternate embodiment of alert receiver 2, a DTMF (dual tone multi frequency) keypad 156, as shown in FIG. 4, can be interfaced with micro controller unit 62, and frequency synthesizer 56, to synthesize different frequencies to permit alert receiver 2 to receive radio channels in VHF, UHF, and in other bands.

Additionally, DTMF keypad. 156 can be interfaced with micro controller unit 62 to program alert tones 164 of specific frequencies and tone sequences. In this manner, alert receiver 2 can be set by the user for specific needs such as to detect a fire company's alert tone on a public service radio channel and then go through the recording, day and time stamp and playback sequences, as set out above.

On/off power supply switch 6 is connected to power supply section 64, as are DC power input jack 24 and DC battery input 36. Alert receiver's 2 power supply positive bus is fed by power supply output 66.

LEDs 8*a–g*, 74, 76, 78, 80, 72, 70 are controlled by LED decoder/latch circuitry 68 which is in turn controlled by micro controller unit 62 through LED control lines 158 *a, b, c*, and *d.*

To conserve power, micro controller unit 62 may be powered down. Micro controller unit's 62 wake up is controlled by wake up timer 82 through wake up timer control line 160.

Micro controller unit 62 receives a clock input from clock IC 84 through clock control lines 148 *a* and *b*. Clock IC 84 is powered through power supply 64 and/or through battery back-up 86. Non volatile memory storage is provided to micro controller unit 62 through EEPROM 88 as controlled by EEPROM control lines 146 *a* and *b*.

The software program to control micro controller unit 62 is stored in EPROM 90 as controlled by EPROM control lines 144*a* and *b*.

Keyboard functions of alert receiver 2 are sensed by micro controller unit 62 through keyboard scanner IC 92. Switches 14, 16, 18, 20, 12, 10, 28, 30, and 32 are connected to keyboard scanner IC 92. Keyboard scanner IC 92 is controlled through keyboard scanner control lines 142 *a* and *b*. Digital speech for day and time stamp functions are provided by speech chip 94 through speech chip control lines 162*a* and 162*b*. The digital voice output of speech chips 94 is provided to audio mixer 104 through digital voice audio output line 134. Alert tone 164 is detected by audio detector 98 through monitoring received audio output 120 from radio receiver section 48. Alert tone 164 may be decoded by an algorithm programmed into micro controller unit 62, as detected by an op amp audio slicer, or by an external phase lock loop tone detection device, generally shown as 98. The logic output from these devices is fed into micro controller unit 62 by means of audio detect logic line 126.

Analog to digital circuitry 100 is connected to micro controller unit 62 by analog to digital control line 128. The analog to digital circuitry monitors the received signal strength indication of IF section 54 of radio receiver 48 by means of received signal strength input line 118. As part of scan mode function of alert receiver 2, analog to digital circuitry 100 senses the relative received analog signal strength output 118 of IF section 54 of radio receiver 48 and writes a digital word corresponding to the relative received signal strength into EEPROM 88, or into micro controller unit 62, by means of analog to digital control line 128. At the end of each scan cycle micro controller unit 62 chooses the channel with relatively strongest signal strength as the signal to monitor. If the received signal strength falls below a preset threshold for a preset length of time, such as for thirty seconds, micro controller unit 62 initiates a new scan cycle.

Due to equipment failures and other malfunctions, such as downed telephone lines or broken recording studio consoles, the weather or emergency radio transmitting station may transmit an unmodulated carrier. An unmodulated carrier provides no useful information to alert receiver 2. Since speaker 108 is normally muted, it is likely that the occurrence of an unmodulated carrier will go undetected thereby giving alert receiver 2 users a false sense of security.

Modulated audio may be detected by means of a peak detector whereby if a predetermined number of modulated peaks are not detected within a predetermined time frame, such as for thirty seconds, micro controller unit 62 will automatically initiate a new scan routine seeking the strongest received radio channel having modulated audio. In this manner, alert receiver 2 will automatically choose the channel with the second strongest received signal strength having modulated audio if the channel with the strongest received signal does not have modulated audio.

The scan function of alert receiver 2 is well adapted for use in mobile installations such as in cars, boats and trucks. As the vehicle moves, alert receiver 2 will automatically seek the broadcast radio channel with the strongest modulated signal from a preselected set of channels. The selection process also will work well where the coverage area of different transmitters on different channels overlaps. In these situations, alert receiver 2 will automatically seek the channel with the strongest received signal having modulated audio from the set of preselected channels.

In fixed installations, the scan feature serves to automatically choose a backup channel if the channel with the strongest received signal either looses carrier or loses modulated audio. Thus, the alert receiver's scan feature may become a critical life saving feature in the event that the primary broadcast radio channel becomes disabled.

Received audio gate 102 is controlled by mute control line 138, which, in turn, is controlled by micro controller unit 62. Received audio gate 102 mutes received audio 120 entering audio mixer 104 when alert receiver 2 is in the playback alert mode, the alarm voice mode or the alarm tone mode. Audio mixer 104 combines received audio signal 120, playback audio 132 from digital storage unit 96, synthesized speech voice from speech chips 94, through digital voice output line 134, and alarm tone 168, generated by micro controller unit 62, as ported to audio mixer 104 through audio line 136.

The output level of audio mixer 104 is adjusted through potentiometer 6. The audio is then ported to audio amplifier 106. Audio amplifier 106 is controlled by audio amp control line 140. The output of audio amplifier 106 is then ported to external speaker jack 42 and speaker 108.

In operation, micro controller unit 62 of alert receiver 2 is programmed to detect alert tone 164 issued by an agency, such as the National Weather Service, or by another emergency agency such as the police, fire, rescue or ambulance services. Alert tone 164 may be of any frequency or sequence of frequencies. It is common that a 1,050 Hz or a 1,650 Hz alert tone is used.

Upon detecting alert tone 164, micro controller unit 62 causes alert message 166, following alert tone 164, to be digitally recorded onto digital voice storage chips 96. The length of alert message 166 to be recorded is limited only by the storage capacity of digital recorder chips 96. Alert message 166 is then automatically day and time stamped by micro controller unit 62. Playback switch 16 is activated to playback alert message 166.

The number and audio frequency of alarm tones 168 is programmed into micro controller unit 62. The number and length of time over which alarm tones 168 are generated should be sufficient to alert listeners to the detection of alert message 166. The timing and frequency of alarm tones 168 should not unduly interfere with ongoing communication on the other communication system. For example, one alarm tone 168 per minute for five minutes might be sufficient when alert receiver 2 is the alarm tone mode, while one alarm tone 168 per minute for fifteen minutes might be acceptable when alert receiver 2 is in the alarm voice mode.

If alert tone 168 is detected and alert receiver 2 is in the alarm tone mode and alert receiver 2 user finds recorded alert message 166 to be of interest to listeners to the other communication system, the alert receiver user can press alarm voice switch 18 and then press playback switch 16 to play alert message 166 over the other communication system. This is well suited for use in broadcast radio stations as it gives the announcer time to review alert message 166 and to alert the listeners that he or she is about to play alert message 166 on the air.

External logic input 172 is provided to sense when the other communication system, such as a land mobile repeater, is in use. Micro controller unit 62 is programmed to delay playing alert message 166 on the other communication system until the other communication system is available. This feature is especially important in fire, police, rescue, ambulance and in other public safety communication applications.

Logic input port 174 is provided to accept remote control signals, such as by DTMF (Dual Tone Multi Frequency), to enable users of alert receiver 2 to remotely control its functions, and in particular, to remotely playback alert message 166 or to link live audio to the other communication system. DTMF decoders are commonly known in the industry and many standard configurations can be used in this application.

A remote control head, with the functions of the switches on front panel 4 of alert receiver 2, may also be input into logic input port 174. A remote control head can be connected to alert receiver 2 in any commonly known manner such as hard wire or radio frequency. A remote control head is especially important in applications in buildings with extensive amounts of steel and computers in which alert receiver 2 must be located in the building's penthouse and the functions of alert receiver 2 are needed elsewhere in the building. This feature is also important for emergency operations centers which are usually located in underground areas.

To indicate the presence of a new and unplayed alert message 166, playback LED 76 will flash from the time alert tone 164 is detected until playback switch 16 is activated.

In a another embodiment of the present invention, alert receiver 2 can be programmed to activate speaker 108, line output 40 and external audio outputs 114, 116, 120 and 42 only in response to specific messages containing a specific digital code. The specific digital codes may be programmed into micro controller unit 62 of alert receiver 2 by means of keyboard 156. For example, if alert message 166 is a tornado warning for a particular county, and the weather service transmits, in addition to alert message 164, a digital message containing the digital code for that particular county, and the user of alert receiver 2 has programmed alert receiver 2 to detect this digital code, speaker 108, line output 40 and external audio outputs 114, 116, 120 and 42 will activate. In this manner the number of warnings which are received and acted upon by alert receiver 2 are held to a minimum and alert receiver 2 filters out warnings which are not of interest to a particular user group. With this feature it is more likely that alert receivers 2 connected to other communication systems, such as public address systems, land mobile and public service repeater systems, will be used in the alarm voice mode as the number of alerts that are inapplicable to that user group are reduced through this digital selective calling feature.

Alert receiver 2 can be used in a multitude of applications where radio voice mail applications are required including in pocket pagers, for lifeguards and rangers temporarily away from their posts and for traveling sales people and emergency service personnel temporarily out of their vehicle. Alert receiver 2 can also be installed in emergency vehicles and in emergency stations, such as fire houses and in fire trucks, to automatically receive and record alert message 166 which would then be instantly available for the emergency service workers when they reached their station and/or equipment. Alert receiver 2 would also be extremely useful to pools, concert halls and other outdoor public assembly areas to instantly and automatically warn of alert messages.

It is understood that while radio communication systems are primarily discussed herein, alert receiver 2 can be adapted to work with almost any communication system, presently known or developed in the future, over which an alert tone 164, followed by an alert message 166, can be transmitted. Alert tone 164 and alert message 166 may be received by alert receiver 2 through the air, through cable or through any communication technology now known or developed in the future.

While specific embodiments of the invention have been shown and described in detail to illustrate the application of the principles of the invention, it will be understood that the invention may be embodied otherwise without departing such principles.

What I claim is:

1. A method of automatically selecting a particular channel from a preselected set of channels comprising the steps of:

a. preselecting a set of channels as received by means for receiving broadcast radio signals;

b. scanning each channel in said preselected set of channels;

c. automatically determining each channel's relative received signal strength;

d. storing each channel's relative received signal strength in a memory bank;

e. automatically selecting said channel with the highest relative received signal strength;

f. monitoring said channel with said highest relative received signal strength until the next scanning cycle during which said channel with said highest relative received signal strength will again be determined, selected and monitored; and, g. automatically activating said scanning cycle after a preset period of time after prior said scanning cycle.

2. A method of automatically selecting a particular channel from a preselected set of channels, as recited in claim 1, wherein said set of preselected channels is the set of a plurality of the allocated government supported weather radio service channels.

3. A method of automatically selecting a particular channel from a preselected set of channels, as recited in claim 1, wherein each of said channel's relative received signal strength is converted from an analog signal level to a corresponding digital signal level.

4. A method of automatically selecting a particular channel from a preselected set of channels, as recited in claim 1, further comprising the step of initiating a new scan sequence after said means for receiving broadcast radio signals senses the loss of received signal strength below a preselected threshold for a preselected time period.

5. A method of automatically selecting a particular channel from a preselected set of channels, as recited in claim 1, further comprising the step of automatically seeking said channel with said highest relative received signal strength having a modulated audio signal as part of each said scanning cycle.

6. An apparatus for automatically selecting a particular channel from a preselected set of channels comprising:

a. means for preselecting a set of channels as received by means for receiving broadcast radio signals;

b. means for scanning each channel in said preselected set of channels;

c. means for automatically determining each channel's relative received signal strength;

d. means for storing each channel's relative received signal strength in a memory bank;

e. means for automatically selecting the channel with the highest relative received signal strength;

f. means for monitoring said channel with said highest relative received signal strength until the next scanning cycle during which said channel with said highest relative received signal strength will again be determined, selected and monitored; and, g. means for automatically activating said scanning cycle after a preset period of time after prior said scanning cycle.

7. An apparatus for automatically selecting a particular channel from a preselected set of channels, as recited in claim 6, wherein said preselected set of channels is the set of a plurality of the allocated government supported weather radio service channels.

8. An apparatus for automatically selecting a particular channel from a preselected set of channels, as recited in claim 6, further comprising means for converting each received channel's relative received signal strength from an analog signal level to a corresponding digital signal level.

9. An apparatus for automatically selecting a particular channel from a preselected set of channels, as recited in claim 6, further comprising means for initiating a new scan sequence after said means for receiving broadcast radio signals senses the loss of received signal strength below a preselected threshold for a preselected time period.

10. An apparatus for automatically selecting a particular channel from a preselected set of channels, as recited in claim 6, further comprising means for automatically seeking said channel with said highest relative received signal strength having a modulated audio signal as part of each said scanning cycle.

* * * * *